July 21, 1925.  1,546,381
J. P. HARRIS
PROCESS AND APPARATUS FOR REACTIVATING CATALYZERS
Filed Dec. 4, 1920
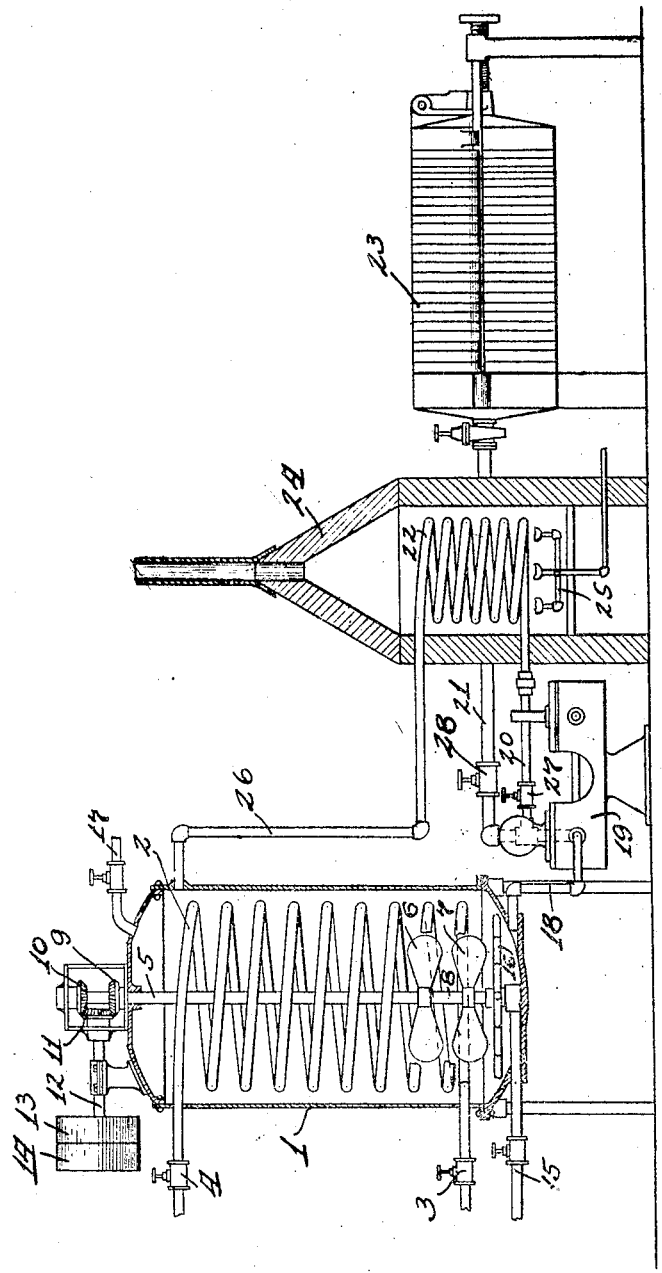

Patented July 21, 1925.

1,546,381

UNITED STATES PATENT OFFICE.

JOHN P. HARRIS, OF CHICAGO, ILLINOIS, ASSIGNOR TO THE ALLBRIGHT-NELL COMPANY, OF CHICAGO, ILLINOIS, A CORPORATION OF ILLINOIS.

PROCESS AND APPARATUS FOR REACTIVATING CATALYZERS.

Application filed December 4, 1920. Serial No. 428,195.

*To all whom it may concern:*

Be it known that I, JOHN P. HARRIS, a citizen of the United States, and a resident of the city of Chicago, in the county of Cook and State of Illinois, have invented certain new and useful Improvements in a Process and Apparatus for Reactivating Catalyzers; and I do hereby declare that the following is a full, clear, and exact description of the same, reference being had to the accompanying drawings, and to the numerals of reference marked thereon, which form a part of this specification.

In the hydrogenation of oil especially edible oil, like cottonseed oil, a catalyzing agent is necessary in order to make the hydrogen combine with the oil to form a saturated compound. This catalyzer usually consists of some finely divided metal, usually nickel, palladium, platinum, copper, iron or the like. Nickel, however, is chiefly used on account of its being commercially available.

When a nickel catalyst is used, it is found that in the course of time this catalyst loses its activity. This appears to be due to the poisoning action of certain chemical substances, such as sulphur, phosphorus, chlorine, zinc, and compounds of the same, and more particularly the formation of soaps or fatty acid compounds of nickel. Various methods have been proposed for regenerating the catalyst. Thus, the nickel has been dissolved in acid, and reprecipitated as a hydroxide by ammonium hydroxide, and then dried on a carrier and reduced in an atmosphere of hydrogen at a high temperature (500° C.). In the other cases, the nickel catalyst has been oxidized on its surface, and then this coating of oxide has been reduced by heating in an atmosphere of hydrogen.

When hardening cotton seed oil, the life of a carefully prepared catalyzer is likely to be very long and in some cases an entirely new lot of catalyzer is not required for weeks in the constant operation of a hardening plant. In these cases the catalyzer is kept in a state of high activity for continued use by adding a small amount of fresh catalyzer with each new batch of oil. However, when the catalyst finally becomes poisoned or spent some method of renewing the same must be resorted to.

Another method of recovering or renewing the nickel when used as a catalyzer, and after it has become poisoned or exhausted after a number of runs of the oil, is to filter the finely divided metal off from the oil, dissolve it in an acid such as nitric acid, precipitate with ammonium hydroxide, wash, and put it through a series of processes, and finally recover it in the form of an organic acid salt of the metal, nickel acetate and formate being the salts that are commonly used.

These processes of recovering are very laborious and expensive, but are ordinarily practiced by all hardeners of oil in preference to buying entirely fresh quantities of the catalyst which would be even more expensive.

This invention relates to an improved method of reactivating catalytic metals, whereby the catalyzer, after having been spent in the production of a number of batches of hydrogenated oil, is renewed to such an extent that an appreciable number of additional batches of oil may be run with the same catalytic agent after treatment.

A further object of this invention is the decomposition of the foreign elements which poison the catalyzer and the bringing of the catalyzer to an active state after such poisoning.

Still another object of the invention is to provide for the use of small additional quantities of fresh catalyzer which can be used with a large batch of oil and old catalyzer and after the treatment as set forth in this invention, will be just as available for the hydrogenation of said oil as an entirely fresh batch of a larger quantity of catalyzer ordinarily is.

A still further object of the invention is the introduction of a method of reactivation of a spent catalyzer whereby any catalyzer, no matter how produced, whether from an oxide or an organic or inorganic salt of nickel or other metal, or whether by finely pulverizing the pure metal with an abrasive or by any other method, may be made active again.

Other and further objects of this invention will be apparent from the disclosures in the specification and drawings.

The apparatus of the invention (in a preferred form) is illustrated in the drawings and hereinafter more fully described.

On the drawings:

The figure represents an elevation, partly in section, of my apparatus used in the reactivation of catalyzers for use in the hydrogenation of oil.

As shown on the drawings:

The reference numeral 1 indicates a tank such as is commonly used for the hydrogenation of oil, having therein a steam coil 2, provided with an inlet 3 and an outlet 4, this steam coil being adapted for the purpose of heating the oil to the required temperature.

Journalled in the tank 1, upon its longitudinal axis, is a hollow shaft 5 having attached thereto a mixing vane 6. This hollow shaft 5 has the mixing vane 6 attached at its lower end and revolvably positioned inside the hollow shaft 5 is the smaller shaft 8, upon which the lower mixing vane 7 is fixed. At the top of the shaft 5 is attached a beveled gear 9, and at the top of the shaft 8 is fixed the beveled gear 10. These gears are adapted to be driven by the gear 11 on the shaft 12 having mounted thereon the driving pulley 13 and a loose pulley 14. As will be seen, revolution of the shaft 12 results in the driving of the vanes 6 and 7 in opposite directions, whereby a thorough mixing of the material is ensured.

An intake pipe 15 for hydrogen gas is provided at the bottom of the tank, and this pipe terminates in a spider 16 provided with a number of perforations through which the hydrogen gas escapes into the oil. A purge or exhaust pipe 17 is provided for the escape of excess hydrogen and any carbon monoxide or other gas evolved from the decomposition of the nickel salt or other catalyst used. The tank may be provided with any suitable means for the introduction of oil together with the spent catalyzer. A pipe 18 leads from the bottom of the tank to a pump 19, which pump is provided with two pipes 20 and 21, leading to the coil 22 and the filter press 23 respectively.

The coil 22 is situated in a heating chamber 24, which is heated by any suitable means which can be easily regulated, such as a series of gas burners, as shown at 25. From the top of the coil 22 extends the pipe 26 leading back into the tank 1 at the top thereof. Suitable valves 27 and 28 are provided in the pipes 20 and 21 in order to control the passage of the oil together with the catalyzer through either the coil 22 or to the filter press 23 as desired.

The operation is as follows:

The batch of oil containing the catalyzer is put into the tank 1 and kept thoroughly mixed by means of the oppositely revolving mixing vanes 6 and 7. At the same time steam is supplied through the coil 2 at about 165° C. in order to raise the batch of oil to the required temperature upon which hydrogenation begins and the temperature rises to approximately 200° C. Any suitable apparatus may be used in place of the tank 1.

In operation, the hydrogenation process is carried out as ordinarily practiced, a current of hydrogen being passed in through the pipe 15 and spider 16 into the tank 1, or any other usual apparatus or by any other method without any use of the coil 22 up to this time.

However, when it is found that after a number of batches of oil have been run, exothermic action fails to take place as expected, which is when the oil fails to absorb hydrogen and the catalyzer appears to be poisoned, a connection is made with the coil 22 whereby the oil, together with hydrogen and the spent catalyzer, is continuously pumped by means of the pump 19 through the coil 22 and the oil in passing through said coil is heated to approximately 220° C., after which it is discharged back into the tank 1 through pipe 26 and, joining the main body of the oil, immediately assumes a lower temperature.

It has been found that as a result of this short exposure of the oil to an increased temperature for a short length of time, the strength of the catalyzer has been increased to quite an appreciable extent and poisons eliminated.

In actual practice, after a run of say 20 to 22 or 23 batches of oil has been made by means of the original catalyzer, an additional number of runs corresponding to about one-third of the original number can be made after reactivation of the catalyzer in the manner set forth above, which has already proved to be of enormous value to oil hardeners.

In operation the oil is heated by means of coil 2 to about 165° C. and, in the case of a spent catalyzer, the temperature does not rise when the hydrogen is admitted which would ordinarily result owing to the exothermic action when the catalyzer is active. Thereupon the mixture is pumped through the coil 22 and is heated to about 220° C., which, on account of the circulation, gradually raises the temperature of the batch in the tank 1 as the operation continues. This is continued until the oil in tank 1 attains a temperature of about 205° C., when circulation is discontinued and hardening will proceed. An atmosphere of hydrogen is always maintained in the tank 1 and preferably under the highest pressure found to be most effective with the particular apparatus used.

A slight modification of the process is as follows: If desired, the hydrogenation of the oil could be accomplished in the apparatus of this invention, or any other successful hydrogenating apparatus, several batches being run off and filtered through the press 23 in the usual manner until the catalyzer has become spent, whereupon a small additional amount of fresh catalyzer may be added and the valve 27, leading into the coil 22 opened, and the pump 19 put into operation, whereupon the entire quantity of new oil together with the spent catalyzer and a small amount of fresh catalyzer is pumped through the coil 22 at the increased temperature. This results in a reactivation of the entire amount of catalyzer whereby an additional number of runs or batches of oil can be secured from the original catalyzer.

This method of reactivation of the catalyzer by the addition of a small amount of a fresh quantity of the catalytic agent has already been practiced, but it resulted in only one or two more runs or batches obtained. However, by the use of the improved coil as shown in this apparatus and the increased heating for a short space of time, an additional six or seven runs or batches of oil may be obtained which greatly increases the efficiency of the method and the catalyzer used.

It appears that the poisoning of the catalyst is due probably to the presence of the palmitate or stearate of the metal, or sometimes to the presence of a soap which is formed by the decomposition of the stearate. Analyses of the catalyst after use show that it contains nickel palmitate, stearate and carbide, which are decomposed by the temporary heat of my invention in the presence of the reducing gas, such as hydrogen, which also acts to remove any poisoning agents from combination with the nickel.

After the additional 6 or 7 runs are obtained by this method, the process can sometimes be repeated until the catalyst becomes permanently poisoned and can then not be renewed in this manner, but must be reclaimed by dissolving in acid and a subsequent reduction and formation of a fatty acid salt of the metal or some other form which has been found to be the most convenient method of using the catalyst.

However, it will be seen that an additional number or runs or hydrogenation of an oil which corresponds to an increase of approximately 33% of the total yield upon a single batch of catalytic agent, will prove to be of inestimable advantage to oil hardeners in view of the quite considerable expense involved in the renewal of a catalytic agent by means of dissolving in acid and subsequent reduction and also the saving accomplished in the amount of new material.

It is obvious that this apparatus can be used primarily for the hydrogenation of oils and that whenever the catalyzer shows signs of becoming spent or poisoned, the valve 27 in the pipe 20 can be opened and the pump 19 started, thereby causing a circulation of the oil to be hardened and the spent catalyst through the heated coils 22, whereupon a reactivation of the catalyst takes place on account of the intense heating with hydrogen which decomposes and removes the foreign elements which poison the catalyzer. Circulation of the oil through the heated coil is continued until a test shows that the oil is again amenable to catalytic action. The usual catalytic action then takes place and is continued until complete saturation. Thus it will be seen that this system of catalyzer reactivation can be readily applied to any process or system of hydrogenation.

I am aware that numerous details of construction of the apparatus and of the method used may be varied through a wide range without departing from the principles of my invention, and I therefore do not purpose limiting the patent granted otherwise than necessitated by the prior art.

I claim as my invention:

1. In an oil hydrogenation process, that method of reactivating the catalyst which includes introducing an additional amount of fresh catalyst into the tank of hydrogen, oil, and spent catalyst, which is maintained at a temperature of approximately 190° C. to 210° C., and pumping the mixture through a coiled pipe connected to the tank, said coiled pipe being maintained at a higher temperature than the oil in the tank.

2. In an oil hydrogenation process, that method of reactivating the catalyst, which includes introducing an additional amount of fresh catalyst into the tank of hydrogen, oil, and spent catalyst, which is maintained at a temperature of approximately 190° C. to 210° C., and pumping the mixture in small portions through a coiled pipe connected to the tank and maintained at a temperature of approximately 220° C.

3. An apparatus for reactivating catalyzers, including a tank having an inlet pipe for reducing gas and an exhaust pipe or outlet, mixing means in the tank, a coil of pipe connected at its upper end to the upper portion of the tank and at its lower end to the lower portion of the tank, said coil of pipe being situated outside the tank, and adapted for additional heating, and a pump for circulating material from the tank through the coil.

In testimony whereof I have hereunto subscribed my name in the presence of two subscribing witnesses.

JOHN P. HARRIS.

Witnesses:
ALBERT J. FIHE,
H. WESCOTT WALKER.